Feb. 9, 1960   W. H. GOSS ET AL   2,924,401
STRAIN GAGE OPERATED WING SERVO
Filed June 26, 1952   2 Sheets-Sheet 1
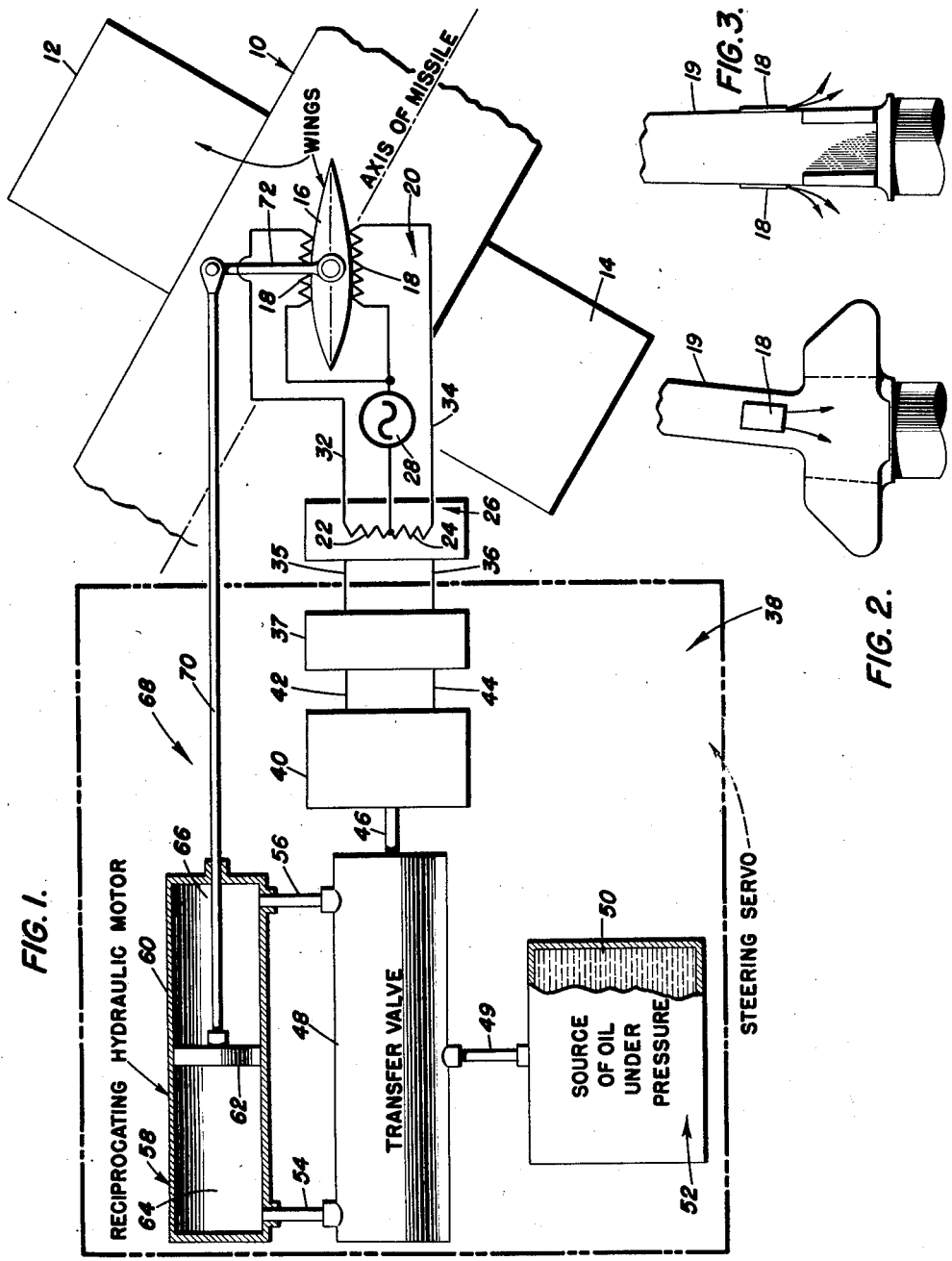
INVENTORS
WILLIAM W. DURDING
BY WILBUR H. GOSS
Attorneys United States Patent Office 2,924,401
Patented Feb. 9, 1960

2,924,401

STRAIN GAGE OPERATED WING SERVO

Wilbur H. Goss and William W. Durding, Silver Spring, Md., assignors to the United States of America as represented by the Secretary of the Navy Application June 26, 1952, Serial No. 295,638

13 Claims. (Cl. 244—77)

The present invention relates to feathering the control surfaces of aerial missiles, and to a strain gage-operated wing feathering servo system for use in providing such feathering.

Heretofore it has been customary to lock the steering control surfaces of an aerial missile at zero incidence with the body of the missile during the launching period, that is, while the booster rocket device was exerting its thrust on the missile. This fixing of the control surfaces adversely affected the aerodynamic stability of the missile-booster combination at low speeds. Feathering of these control surfaces removes their contribution to such instability.

It is the principal object of this invention to provide an arrangement for feathering the steering control surfaces of an aerial missile during the launching period in order to make the missile stable in flight and also to correct for incipient deviations of the missile from the intended course of flight, in descending order of significance.

Another object of the invention is to provide an arrangement, including strain gages and regular control surface servos, for feathering the control surfaces of the missile to give zero lift thereto during the boost period.

In accordance with the invention, an aerial missile comprising steering control surfaces has strain gages located on the surfaces of steering control surfaces where the control surfaces join the body of the missile such that bending of the control surfaces due to an angle of attack thereof actuates the strain gages to produce a control error signal. This control error signal is then utilized by control means to modify the angle of attack of the control surfaces in a manner which decreases the control error signal and, at the same time, feathers the steering control surfaces of the missile to give zero lift and consequently zero destabilizing moment during the booster period of the missile.

Other objects and many of the attendant advantages of this invention will be appreciated readily as the same becomes understood by reference to the following description, when considered in connection with the accompanying drawings, and in which:

Fig. 1 is a block diagram illustrating a preferred form of the invention;

Fig. 2 is a plan of a main control surface spar at the root end, illustrating the application of the strain gages;

Fig. 3 is an end elevation of the main control surface spar illustrated in Fig. 2.

Figure 4:
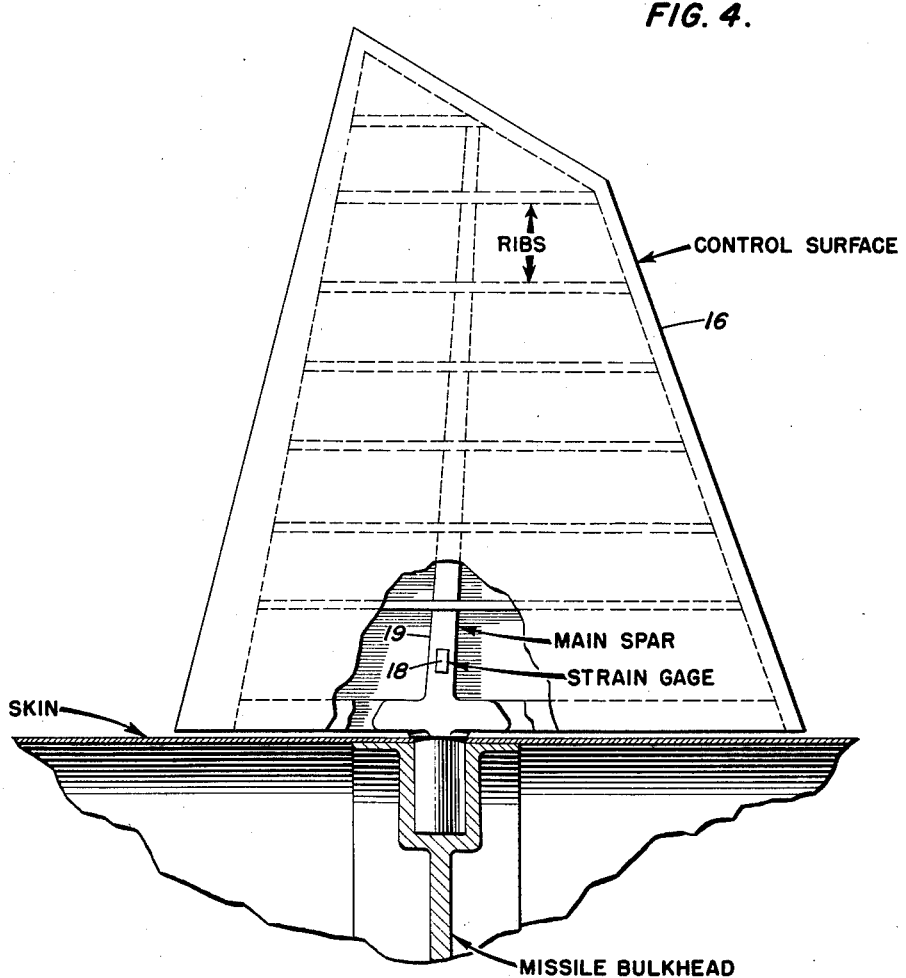
Fig. 4 is an enlarged plan view, with a portion of the surface removed, of a control surface, showing the location of the main control surface spar therein.

An aerial missile 10 of the ramjet type is shown fragmentarily in the single drawing to disclose the region in which the steering control surfaces 12, 14, 16, are located. It is to be understood that the present invention is not limited to ramjet types of missile, but can be used with other types of aerial missiles, such as rocket-propelled and the like. For simplicity, in the present operative example, only one pair of strain gages 18 connected in a Wheatstone bridge circuit 20 is illustrated, although it will be understood that a separate pair of strain gages 18 will ordinarily be attached to the top and bottom surfaces of each independently rotatable control surface, such as control surface 16, where the control surfaces join the body of the missile 10. Generally it has been found advisable to equip one of the main control surface spars, such as 19, shown in Figs. 2, 3 and 4, of each control surface pair with a pair of strain gages 18, although other spars of each control surface pair can be equipped with a pair of strain gages.

Strain gages 18 form one-half of the Wheatstone bridge circuit 20, while fixed resistors 22 and 24 form the other half of the bridge circuit 20. These balanced resistors 22 and 24 are part of a conventional pre-amplifier 26, which is so arranged to sense the direction and the magnitude which wing 16 turns. A source 28 of alternating current is provided to energize the Wheatstone bridge 20 or bridges.

As pointed out previously, the strain gages 18 of Wheatstone bridge circuit 20 are so associated with its corresponding control surface, such as 16, preferably at its base or region of attachment to the missile 10, that deformation of the strain gages 18 occurs whenever there is an angle of attack of control surface 16.

Conductors 32 and 34 connect the strain gages 18 to the input side of preamplifier 26, which, in turn, is connected by conductors 35 and 36 to the input side of the conventional amplifier 37 of the steering servo 38.

Servo 38 may be of the conventional type, and comprises a torque motor 40 which is actuated by the output of amplifier 37, delivered through conductors 42 and 44. The torque motor 40 has a reciprocating output shaft 46 which is directly connected to the stem (not shown) of a transfer valve 48. This is a hydraulically-operated valve that controls the flow, through passageway 49, of high pressure oil 50 contained in a tank 52 to transfer valve 48.

This transfer valve 48 connects passageway 49 to either passageway 54 or 56, leading to a reciprocating hydraulic motor 58, or shuts passageway 49 off in the "neutral" position so that no oil will flow from tank 52.

The reciprocating hydraulic motor 58 comprises a cylinder 60 having a piston 62 therein so as to divide it into two chambers 64 and 66. This motor 58 cooperates with transfer valve 48 and the steering wing 16. The piston 62 is connected by a suitable mechanical linkage 68 consisting of a piston rod 70 and crank arm 72, the latter being secured in suitable fashion to the control surface 16 to rotate it. The hydraulic medium introduced into chambers 64 and 66 can be returned through suitable means to tank 52 or can be dumped overboard (not shown).

The operation of the invention should be clear from the structures described above, and may be summarized briefly as follows.

Whenever there is no control surface angle of attack, that is, when there is zero lift on the control surfaces, such as 16, when the missile 10 is going through the booster period after being launched by the booster rocket (not shown) from a launching platform, the strain gage bridge 20 will be balanced, and the steering servo 38 will hold the control surfaces 16 at the existing incidence angle with the missile 10.

However, if deviations do occur, there will be a bending moment on, say, control surface 16. This bending moment will deform the strain gage 18 in the corresponding sense, and provide a signal to preamplifier 26. The output from preamplifier 26 is then fed into the main control surface servo 38 to drive the control surface pair 16. This is accomplished by the signal from amplifier 37 which actuates the torque motor 40. This motor 40, through reciprocating output shaft 46 and transfer valve 48 controls the flow of oil 50 from the oil reservoir 52 to the reciprocating hydraulic motor 58, which, in turn, through piston rod 70 and crank arm 72, adjusts the position of control surface pair 16. Control surface pair 16 is turned until the aerodynamic lift stressing the control surface spar 19 is removed and the output of the strain gages 18 returns to zero. The Wheatstone bridge 20 is then balanced, with the input of the control surface servo 38 going to zero, and the control surface incidence angle remains at the proper value to keep the strain gages 18 nulled.

The foregoing is strictly true only if the local position feedback normally operating in the control surface servo loop is opened. It is expected that this feedback loop, which alone requires the control surface incidence to be zero for zero input to the servo 38 will remain closed, but with somewhat less than the usual gain. Consequently, the control surface 16 will assume a resultant incidence angle between the two called for, and closer to the one with the large effective gain.

Before launching of the ramjet missile 10, therefore, the strain gage loop is effectively open so that the position feedback holds the control surfaces 16 at zero incidence. After launching of the missile 10, the strain gages 18 signals increase rapidly, so that control surface feathering assumes the major role and positions the control surface pair 16 to minimize the angle of attack.

Obviously many modifications and variations of the present invention are possible in the light of the above teachings. It is, therefore, to be understood that within the scope of the appended claims the invention may be practiced otherwise than as specifically described.

What is claimed is:

1. An arrangement for feathering the control surfaces of an aerial missile, comprising, means associated with at least one of said control surfaces of said missile so that bending of said control surfaces due to an angle of attack thereof actuates said means to produce a control error signal having a characteristic representing the sense and magnitude of said bending, and control means utilizing said control error signal to drive said control surfaces at a rate proportional to the control error signal until said control error signal is nulled.

2. An arrangement for feathering the control surfaces of an aerial missile, comprising, strain gage means associated with at least one of said control surfaces of said missile so that a bending of said one control surface due to an angle of attack thereof actuates said means to produce a control error signal having a characteristic representing the sense and magnitude of said bending, and control means utilizing said control error signal to drive said control surfaces at a rate proportional to the control error signal until said control error signal is nulled.

3. An arrangement for feathering the control surfaces of an aerial missile, comprising, circuit means including strain gage elements associated with at least one of said control surfaces of said missile so that a bending of said control surface due to an angle of attack thereof actuates said strain gage elements to produce a control error signal having a characteristic representing the sense and magnitude of said bending, and control means utilizing said control error signal to drive said control surfaces at a rate proportional to the control error signal until said control error signal is nulled.

4. An arrangement for feathering the control surfaces of an aerial missile, comprising, circuit means including a strain gage located where one of said control surfaces joins the body of said missile so that a bending of said one control surface due to an angle of attack thereof actuates said strain gage to produce a control error signal having a characteristic representing the sense and magnitude of said bending, and control means utilizing said control error signal to drive said control surfaces at a rate proportional to the control error signal until said control error signal is nulled.

5. An arrangement for feathering the control surfaces of an aerial missile, comprising, a Wheatstone bridge circuit having means forming part of said circuit and associated with at least one of said control surfaces of said missile so that a bending due to an angle of attack of said control surfaces actuates said means to produce a control error signal in said circuit having a characteristic representing the sense and magnitude of said bending, and control means utilizing said control error signal to drive said control surfaces at a rate proportional to the control error signal until said control error signal is nulled.

6. A mechanism for feathering the control surfaces of an aerial missile, comprising, a Wheatstone bridge circuit having means forming part of said circuit and located where one of said control surfaces joins the body of said missile such that a bending due to an angle of attack of said control surfaces actuates said means to produce a control error signal in said circuit having a characteristic representing the sense and magnitude of said bending, and control means utilizing said control error signal to drive said control surfaces at a rate proportional to the control error signal until said control error signal is nulled.

7. A mechanism as set forth in claim 6, wherein said means on said control surface for generating a control error signal comprises a strain gage arrangement.

8. A mechanism as set forth in claim 6, wherein said control means comprises a steering servo amplifier arrangement.

9. An arrangement for feathering the control surfaces of an aerial missile, comprising, strain gage means located on opposite sides of one of said control surfaces where the control surface joins the body of said missile such that a bending of the control surface due to an angle of attack thereof actuates said means to produce a control error signal having a characteristic representing the sense and magnitude of said bending, and control means utilizing said control error signal to drive said control surfaces at a rate proportional to the control error signal until said control error signal is nulled.

10. An arrangement as set forth in claim 9, wherein said means for generating said control signal comprises two strain gages forming one-half of a Wheatstone bridge circuit.

11. An arrangement as set forth in claim 10, wherein the other half of said Wheatstone bridge circuit is formed by balanced resistors.

12. An arrangement as set forth in claim 11, wherein said control means comprises a steering servo amplifier.

13. An arrangement for feathering the control surfaces of an aerial missile, comprising, a Wheatstone bridge circuit, a pair of strain gages forming one-half of said Wheatstone bridge circuit and located where one of said control surfaces joins the body of said missile such that a bending of said control surfaces due to an angle of attack thereof actuates said pair of strain gages to produce a control error signal in said circuit having a characteristic representing the sense and magnitude of said bending, a preamplifier including a pair of balanced resistors forming the other half of said Wheatstone bridge circuit, and a steering servo arrangement including an amplifier for amplifying said control error signal from said preamplifier, a torque motor actuated by the output of said amplifier, a hydraulically-operated transfer valve, said transfer valve being associated with said torque motor, a hydraulic motor, said hydraulic motor being mechanically connected to said transfer valve, and a mechanical linkage operated by said hydraulic motor for driving said control surfaces at a rate proportional to the control error signal until said control error signal is nulled.

References Cited in the file of this patent

UNITED STATES PATENTS

| | | |
|---|---|---|
| 2,411,139 | Roy | Nov. 12, 1946 |
| 2,528,575 | Broadbent | Nov. 7, 1950 |
| 2,553,546 | Brannin | May 22, 1951 |
| 2,626,114 | Alderson | Jan. 20, 1953 |
| 2,666,177 | Brannin | Jan. 12, 1954 |